United States Patent [19]

Johnson

[11] 4,016,443
[45] Apr. 5, 1977

[54] TURBINE GENERATOR END-WINDING SUPPORT APPARATUS

[75] Inventor: Larry A. Johnson, Concord, Tenn.

[73] Assignee: Westinghouse Electric Corporation, Pittsburgh, Pa.

[22] Filed: May 22, 1975

[21] Appl. No.: 579,754

[52] U.S. Cl. .............................. 310/260; 310/194
[51] Int. Cl.² .......................................... H02K 3/46
[58] Field of Search ............. 310/194, 91, 260, 89, 310/270, 271; 336/197, 185

[56] References Cited

UNITED STATES PATENTS

| | | | |
|---|---|---|---|
| 967,240 | 8/1910 | Roberts | 310/260 |
| 1,329,242 | 1/1920 | Hellmund | 310/260 UX |
| 3,435,517 | 4/1969 | Fortenbach | 310/260 |
| 3,908,143 | 9/1975 | Buncher | 310/260 |

FOREIGN PATENTS OR APPLICATIONS

| | | | |
|---|---|---|---|
| 1,032,381 | 6/1958 | Germany | 310/260 |
| 914,751 | 7/1954 | Germany | 310/260 |

Primary Examiner—R. Skudy
Attorney, Agent, or Firm—C. L. McHale

[57] ABSTRACT

A plurality of non-conductive rings are positioned around the outside surface which is defined by the end-winding conductors. A plurality of non-conductive flexure plates are secured to the rings and extend radially outward therefrom. The flexure plates are also secured to the generator frame by a coupling assembly which permits tangential movement and prevents axial and radial movement of the outermost flexure plate end. The plates flex in the axial direction to compensate for temperature responsive dimensional changes of the end-winding assembly.

7 Claims, 5 Drawing Figures

TURBINE GENERATOR END-WINDING SUPPORT APPARATUS

BACKGROUND OF THE INVENTION

1. Field of the Invention

This invention relates, in general, to electromechanical apparatus and, more specifically, to generator end-winding support systems.

2. Description of the Prior Art

End-winding conductor supporting arrangements for turbine generators have conventionally used various forms of bracing rings and restraint assemblies or brackets which are generally attached to the end of the stator iron core assembly. Such arrangements have been satisfactory in many applications, but their use has certain inherent disadvantages when used in large turbine generators. The bracing rings and the winding conductors are secured to the brackets, usually by an arrangement of glass roping which extends around the conductors. When the temperature of the stator iron core increases, the thermal expansion pattern of the brackets tends to deflect the brackets outwardly away from the end-winding conductors. The resulting looseness between the brackets and the conductors, even when very minute, detrimentally affects the ability of the conductors to withstand the large forces encountered under overload current conditions and the constant forces encountered under normal current conditions without damage to the conductor.

The thermal expansion pattern of the conductors also causes the conductors to expand axially away from the stator iron core as the temperature increases. This movement also tends to increase the distance between the conductors and the brackets due to the conical configuration of the end winding conductors. Thus, the integrity of the bracing arrangement is degraded due to the movement of the conductors relative to the supporting brackets.

In addition to the above-mentioned temperature responsive movements, it has been found that it is difficult to maintain the dimensions of the end shield or support plate within the tolerances necessary to properly hold the brackets in the desired location. Also, the conventional end-winding conductor supporting arrangements have not provided sufficient flexibility to allow for tangential rotation of the end-winding assembly due to thermal changes. Therefore, it is desirable, and it is an object of this invention, to provide an end-winding conductor supporting arrangement which satisfactorily compensates for the axial and tangential movements of the winding assembly while still providing sufficient radial support therefor to withstand the radial forces encountered during normal and overload operating conditions.

SUMMARY OF THE INVENTION

There is disclosed herein a new and useful end-winding conductor supporting arrangement which supports the conductors from the generator frame rather than from the stator iron core. The supporting arrangement includes one or more circular rings which are disposed around the outside of the conductors and are attached thereto by suitable bands or straps. A plurality of non-metallic flexure plates are attached to each ring and to the generator frame. Each flexure plate extends radially from its associated ring and has an axial thickness which is substantially less than its radial length. The outer end of each flexure plate is connected through a coupling assembly to the generator frame. The coupling assembly contains a slot which permits tangential movement of the outer flexure plate end but prevents axial and radial movement thereof. Since the ratio of axial thickness to radial length is small, the flexure plates flex or bend to allow axial movement of the end-winding conductor assembly produced by conductor expansion.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
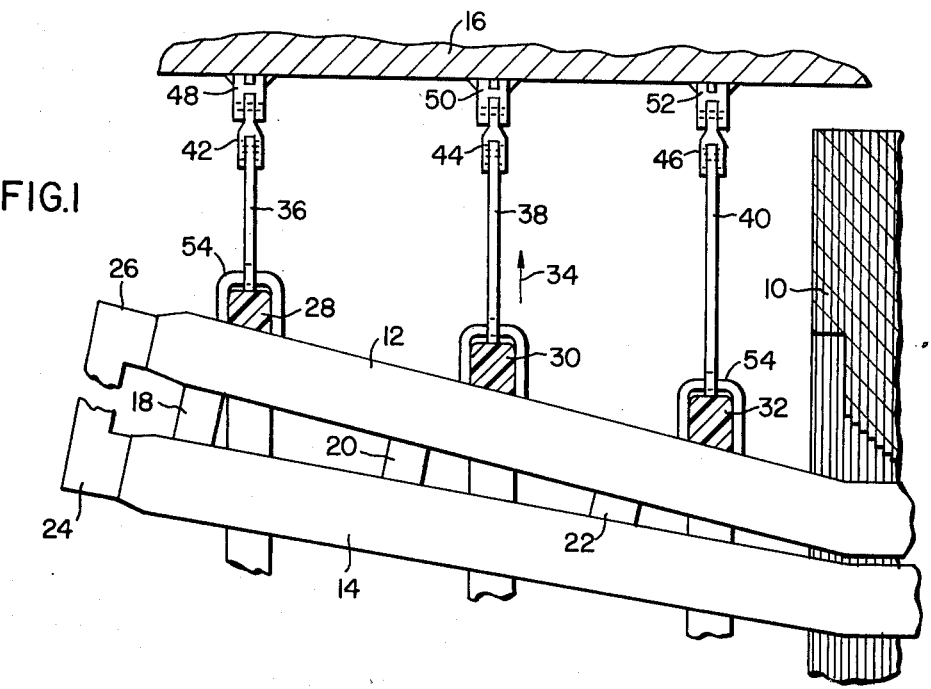
FIG. 1 is a partial side view of a generator end-winding assembly having a supporting arrangement constructed according to this invention.

Throughout the following description, similar reference characters refer to similar elements or members in all of the figures of the drawing.

Referring now to the drawing, and to FIG. 1 in particular, there is shown the end-winding portion of a turbine generator constructed according to this invention. The generator includes the stator iron core 10, the end-winding conductors 12 and 14, and the frame 16 which extends around the internal components of the turbine generator. The end-winding conductors 12 and 14 extend from the stator iron core 10 and require a supporting assembly to maintain the position of the conductors during the operation of the generator. The end-winding supporting assembly must be capable of maintaining the position of the end-winding conductors when they are subjected to large electromechanical forces during the operation of the generator, and allowing for movement of the conductors due to thermal expansion patterns of the end-winding conductor assembly.

The blocks 18, 20 and 22 separate the end-winding conductors 12 and 14 and help to maintain the relative spacing therebetween. The end-winding connections 24 and 26 connect together appropriate end-winding conductors to provide the desired electrical circuit. Although shown in FIG. 1 as a plan view, generally the winding conductors which extend from different radial positions of the iron core 10 are directed in different directions. In addition, similar end-winding conductors extend around the entire circumference of the stator iron core 10, thus FIG. 1 is a view showing only two of the end-winding conductors of the many which extend from the stator iron core 10.

The supporting assembly includes the supporting rings 28, 30 and 32 which extend around the outside of the end-winding conductor assembly. The support rings 28, 30 and 32 are located at different axial positions within the generator, with the axial direction being defined as a direction which is parallel to the center axis of the generator rotor assembly, which is not illustrated in FIG. 1. Similarly, the radial direction is a direction which extends perpendicular to the rotor axis and is indicated in FIG. 1 generally by the arrow 34. The tangential direction, which will be referred to herein, is directed perpendicular to both the radial direction 34 and the axial direction as herebefore defined.

The supporting rings 28, 30 and 32 are attached to the flexure plates 36, 38 and 40. The supporting rings and the flexure plates are constructed of a suitable non-magnetic and electrically insulating material, such as a glass reinforced epoxy resin. One of the ends of the flexure plates are connected to the supporting rings 28, 30 and 32, and the other or outer ends of the flexure plates 36, 38 and 40 are connected to the plate couplings 42, 44 and 46. The plate couplings extend into the coupling guides 48, 50 and 52 which are rigidly attached to the frame 16. The coupling apparatus provided by the plate couplings and the coupling guides allows the upper ends of the flexure plates 36, 38 and 40 to move in a tangential direction but prevents movement in the axial and radial directions.

Figure 2:
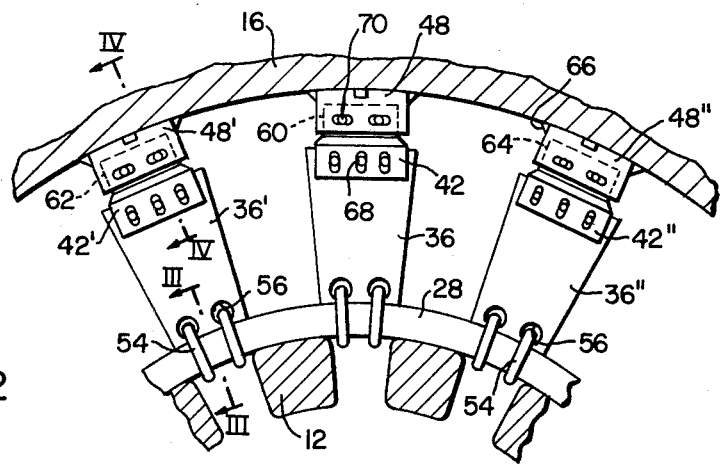
FIG. 2 is a partial end view of the end-winding assembly illustrated in FIG. 1.

FIG. 2 is a more detailed view of the flexure plate assemblies and is generally the view looking in toward the end of the turbine generator illustrated in FIG. 1. The flexure plates 36, 38 and 40 are connected to the ring 28 with the aid of the bands 54 which are wrapped around the ring 28 and through the openings 56 in the flexure plates. Although not shown in FIGS. 1 and 2, the end-winding conductors are suitably bound or strapped to the various supporting rings to provide an integral end-winding assembly. Thus, restraint of the end-winding conductor assembly may be maintained by restraint of the supporting rings 28, 30 and 32.

The flexure plates 36, 36' and 36'' shown in FIG. 2 are positioned at substantially the same axial position in the turbine generator. The complete generator would have additional flexure plates positioned at different radial positions around the entire circumference of the generator axis. Similarly, other flexure plates would be disposed around the circumference of the generator axis and in axial alignment with the flexure plates 38 and 40.

The plate couplings 42, 42' and 42'' may be constructed of a suitable material which exhibits sufficient strength to maintain its shape when subjected to the forces encountered during the operation of the generator. In the preferred embodiment illustrated, the plate couplings 42, 42' and 42'', and the coupling guides 48, 48' and 48'' are constructed of steel.

The plate couplings include projecting members 60, 62 and 64 which extend into slots in the coupling guides 48, 48' and 48'', respectively. The coupling guides are also rigidly attached to the generator frame 16 and are reinforced by the ribs 66. The pins 68 and 70 in the clamping assemblies are used to limit the amount of movement in a particular direction, as will be described more fully hereinafter.

Figure 3:
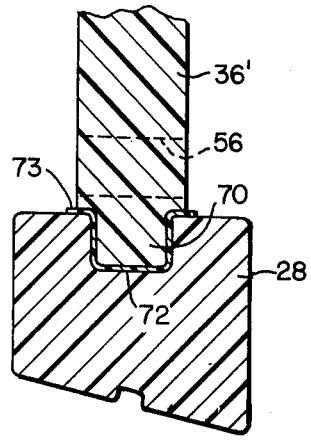
FIG. 3 is a cross-sectional view taken generally along the line III-III of FIG. 2.

FIG. 3 is a cross-sectional view taken generally along the line III-III illustrated in FIG. 2. FIG. 3 illustrates the arrangement used in this specific embodiment of the invention to attach the flexure plate 36' to the ring 28. The flexure plate 36' includes a narrowed projection 70 which extends into a groove 72 around the inner surface of the ring 28. A suitable liner 73, such as a resin impregnated Dacron cloth, is positioned between the projection 70 and the ring 28 to provide a conformable spacing member therebetween and to provide some adhesion between the ring 28 and the flexure plate 36'. Additional securing of the flexure plate 36 to the ring 28 may be provided by extending the bands 54 around the ring 28 and through the openings 56, as shown in FIG. 2.

Figure 4:
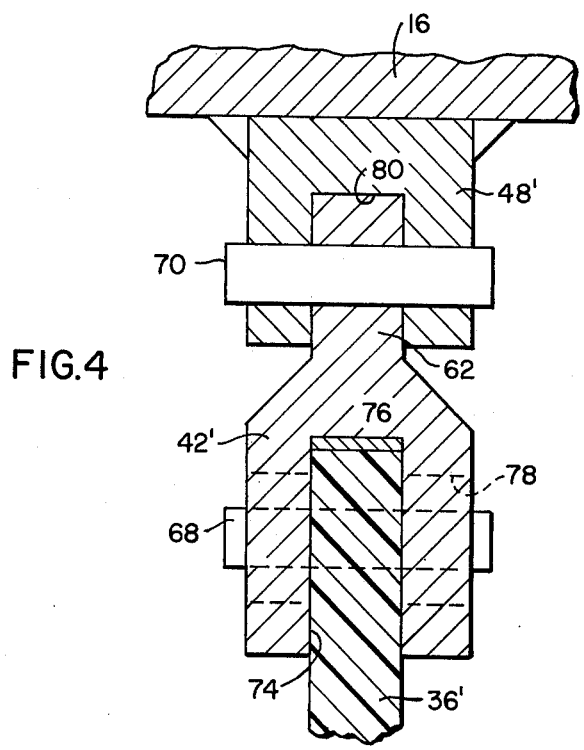
FIG. 4 is a cross-sectional view taken generally along the line IV-IV of FIG. 3.

FIG. 4 is a cross-sectional view taken generally along the line IV—IV of FIG. 2 illustrating how the outer end of the flexure plate 36' is attached to the generator frame 16. The coupling 42' contains a channel 74 in which the upper end of the flexure plate 36' extends. A suitable wedge 76 is inserted between the bottom of the channel 74 and the end of the flexure plate 36' to establish the proper radial distance between the plate coupling 42' and the flexure plate 36'. This provides the desired amount of initial radial force to be applied to the end-winding conductor assembly.

Figure 5:
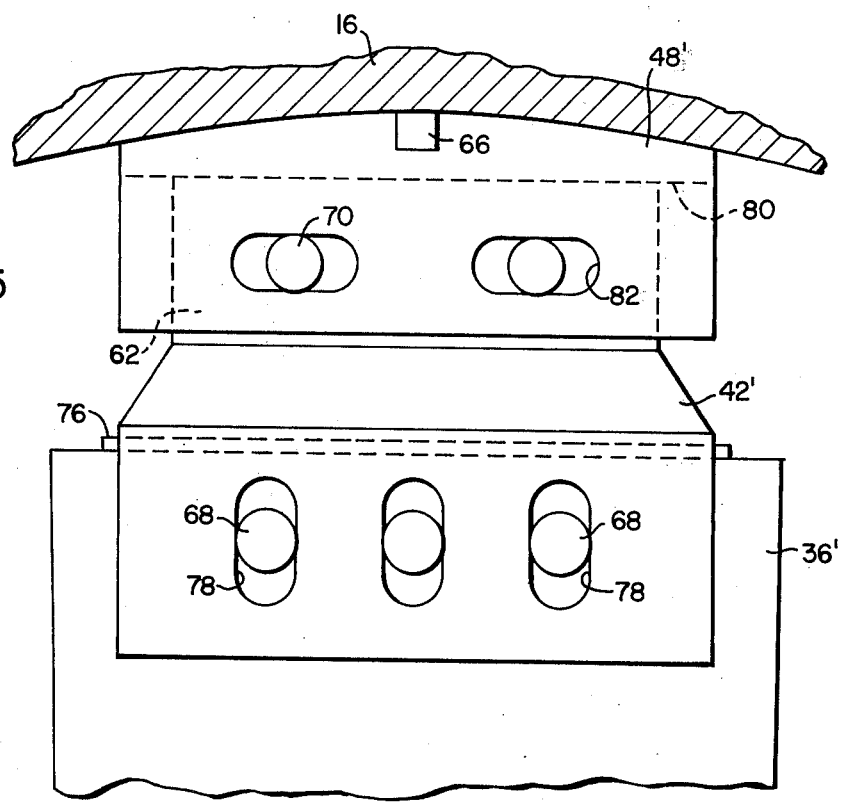
FIG. 5 is an end view of the structure illustrated in FIG. 4.

Referring also to FIG. 5, the openings 78 in the plate coupling 42' are larger than the pins 68 which extend through these openings and through the flexure plate 36', thereby allowing for relative radial movement between the plate coupling 42' and the flexure plate 36' and permitting the proper size wedge 76 to be placed therein. The openings 78 do not permit any tangential movement of the pins 68 relative to the plate coupling 42', thus the upper end of the flexure plate 36' is rigidly maintained in the tangential direction with the plate coupling 42'.

The projecting member 62 of the plate coupling 42' extends into a slot 80 in the coupling guide 48'. The slot 80 is dimensioned to allow movement of the projecting member 62 therein in the tangential direction but to prevent any movement of the projecting member 62 in the axial or radial directions. Thus, as orientated in FIG. 4, the projecting member 62 may not move either horizontally or vertically in the plane of the figure, and as orientated in FIG. 5, may move horizontally in the plane of FIG. 5. Although illustrated in this particular embodiment as a flat surface, the bottom of the slot 80 and the end of the projecting member 62 may be curved slightly to prevent increased radial forces when the plate coupling 42' is deflected tangentially along the channel 80. However, with the small amount of tangential movement usually experienced in turbine generators, the flat surfaces illustrated provide a suitable working embodiment of the invention.

The openings 82 are enlarged in the tangential direction to permit the tangential movement of the pins 70. It is within the contemplation of this invention that a suitable lubricating or sliding material may be positioned between the bottom of the slot 80 and the end of the projecting member 62 to provide surfces in which the frictional forces are minimal to enhance the ability of the coupling assembly to permit tangential movement of the flexure plates.

Referring back to FIG. 1, the flexure plates which are located at different axial positions within the generator are constructed of a material which has sufficient dimensions to allow flexing or deformation of the plates due to forces thereon generated by the thermal expansion pattern of the end-winding conductors. In general, the thickness of the flexure plates would be sufficiently thin to permit deflection of the plates from the upper end thereof, while still maintaining sufficient radial strength in the plates to serve their function as a radial support for the end-winding conductor assembly. Thus, the various dimensions of the flexure plates may be determined in such a manner that the plates exhibit a sufficient amount of rigidity in the tangential direction between the upper and lower ends thereof. Since the thermal expansion characteristics of the end-winding conductors change according to the axial position along the conductors, the dimensions of the flexure plates at different axial positions in the generator may be different.

The overall supporting assembly sufficiently supports the end-winding conductor assembly in the radial direction against the forces encountered during the operation of the turbine generator. Movement of the end-winding conductor assembly in the axial direction due to temperature expansion characteristics is provided for the flexing of the flexure plates, with the different amounts of expansion along the axial length of the conductors being accounted for by the different amount of flexing of the various plates positioned at different axial positions along the end-winding conductors. In addition, the tangential movement of the end-winding conductor assembly is permitted by the tangential movement permitted at the upper ends of the flexure plates.

Since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. Apparatus for supporting the end-winding conductors of a turbine generator, comprising:
    a plurality of rings surrounding the outside of and secured to the end-winding conductors at different axial positions, with each ring connected to a plurality of radially extending flexure plates which are connected to the frame of the generator" has been inserted;
    the plurality of flexure plates having first and second ends and radially extending outwardly from said rings;
    first means for connecting the first ends of the flexure plates to said rings; and
    second means for connecting the second ends of the flexure plates to the frame of the generator, said second connecting means preventing axial and radial movement of the second flexure plate ends and permitting tangential movement of the second flexure plate ends.

2. The apparatus of claim 1 wherein the flexure plates are tangentially spaced around the circumference of the rings.

3. The apparatus of claim 1 wherein the flexure plates have an axial thickness dimension which is substantially less than the radial length of the flexure plates, therefore permitting the plate to flex in the axial direction.

4. The apparatus of claim 1 wherein the second means for connecting the second ends of the flexure plates to the generator frame includes means for permitting only a predetermined amount of tangential movement of the flexure plates with respect to the generator frame.

5. The apparatus of claim 1 wherein the second means for connecting the second ends of the flexure plates to the generator frame includes means for establishing a radial force on the flexure plates.

6. Apparatus for supporting the end-winding conductors of a turbine generator, comprising:
    a ring surrounding the outside of and secured to the end-winding conductors;
    a plurality of flexure plates having first and second ends and radially extending outwardly from said ring;
    first means for connecting the first ends of the flexure plates to said ring wherein the first ends of the flexure plates are positioned in a groove which is located on the outer surface of the ring; and
    second means for connecting the second ends of the flexure plates to the frame of the generator, said second connecting means preventing axial and radial movement of the second flexure plate ends and permitting tangential movement of the second flexure plate ends.

7. Apparatus for supporting the end-winding conductors of a turbine generator, comprising:
    a ring surrounding the outside of and secured to the end-winding conductors;
    a plurality of flexure plates having first and second ends and radially extending outwardly from said ring;
    first means for connecting the first ends of the flexure plates to said ring;
    second means for connecting the second ends of the flexure plates to the frame of the generator, said second connecting means preventing axial and radial movement of the second flexure plate ends and permitting tangential movement of the second flexure plate ends;
    said second means comprising plate couplings attached to the second ends of the flexure plates, said plate couplings having a projecting member which extends in a raidal direction toward the generator frame, and coupling guides rigidly attached to the generator frame, said coupling guides containing a tangentially extending slot in which the projecting member of the plate couplings extend.

* * * * *